US007516083B1

(12) United States Patent  
Dvorak et al.

(10) Patent No.: US 7,516,083 B1
(45) Date of Patent: Apr. 7, 2009

(54) METHOD OF COMPARING PRORATED INVENTORY BUDGETS AND SIMULATED FUTURE INVENTORY

(75) Inventors: Robert E. Dvorak, Atherton, CA (US); Richard W. Pasternack, Tiburon, CA (US); Ronald Samuel Cope, Walnut Creek, CA (US); Beth Li-Ju Chen, Port Jefferson, NY (US)

(73) Assignee: Bluefire Systems, Inc., San Francisco, CA (US)

( * ) Notice: Subject to any disclaimer, the term of this patent is extended or adjusted under 35 U.S.C. 154(b) by 860 days.

(21) Appl. No.: 09/888,336

(22) Filed: Jun. 22, 2001

(51) Int. Cl.
*G06F 17/30* (2006.01)
(52) U.S. Cl. .......................... 705/10; 705/22
(58) Field of Classification Search ............... 705/10, 705/22
See application file for complete search history.

(56) References Cited

U.S. PATENT DOCUMENTS

| | | | |
|---|---|---|---|
| 5,168,445 A | 12/1992 | Kawashima et al. | |
| 5,596,493 A | 1/1997 | Tone et al. | |
| 5,712,985 A * | 1/1998 | Lee et al. | 705/7 |
| 5,953,707 A * | 9/1999 | Huang et al. | 705/10 |
| 5,966,695 A | 10/1999 | Melchione et al. | |
| 6,009,407 A * | 12/1999 | Garg | 705/10 |
| 6,044,357 A * | 3/2000 | Garg | 705/10 |
| 6,078,900 A * | 6/2000 | Ettl et al. | 705/28 |
| 6,151,582 A | 11/2000 | Huang et al. | |
| 6,341,269 B1 * | 1/2002 | Dulaney et al. | 705/22 |
| 6,370,509 B1 | 4/2002 | Ross et al. | |
| 6,434,544 B1 | 8/2002 | Bakalash et al. | |
| 6,493,678 B1 | 12/2002 | Foster et al. | |
| 6,510,420 B1 | 1/2003 | Cessna et al. | |
| 6,609,101 B1 * | 8/2003 | Landvater | 705/10 |
| 6,834,266 B2 | 12/2004 | Kumar et al. | |
| 2002/0147630 A1 | 10/2002 | Rose et al. | |
| 2003/0061081 A1 * | 3/2003 | Kellond et al. | 705/7 |
| 2003/0074251 A1 | 4/2003 | Kumar et al. | |
| 2003/0229502 A1 | 12/2003 | Woo | |

OTHER PUBLICATIONS

Ackerman, Jerry, "Looking Back to Fashion's Future", The Boston Globe, Oct. 7, 1998 [retrieved Sep. 9, 2004], pp. 1-3, retrieved from Google.com and archive.org.
Hauge et al., *"How Low Can You Go? Using Simulation to Determine Appropriate Inventory Levels"*, attributed to IIE Lean Management Solutions, Sep. 23-24, 2002, Seattle, WA, (publication data unverified) <http://www.novasim.com/downloads/How%20Low%20Can%20You%20Go.pdf>, accessed Jan. 10, 2005.

(Continued)

*Primary Examiner*—Romain Jeanty
(74) *Attorney, Agent, or Firm*—Ernest J. Beffel, Jr.; Haynes Beffel & Wolfeld (57) ABSTRACT

Disclosed are methods of and apparatus for analyzing projected future inventory against inventory budgets to determine open-to-buy inventory values. Inventory budgets are set, then demand is projected and some or all of notional deliveries, sales and inventory are simulated at the item level, capturing the interaction of inventory and sales. Analytic reports are generated that compare open to buy values and inventory budgets. The reports may indicate lost sales and may segregate saleable inventory from component inventory.

26 Claims, 6 Drawing Sheets

OTHER PUBLICATIONS

Kumar, Mahesh et al., Clustering Seasonality Patterns in the Presence of Errors, Paper 155, May 2002, http://ebusiness.mit.edu.

Kumar, Mahesh, Error-based Clustering and Its Application to Sales Forecasting in Retail Merchandising, Sep. 2003, Massachusetts Institute of Technology.

Lin et al., "*Extended-Enterprise Supply-Chain Management at IBM Personal Systems Group and Other Divisions*", Interfaces 30:1, pp. 7-25, at pp. 12-13 (Jan.-Feb. 2000) available at <http://www.interfaces.smeal.psu.edu/pdf/v30n1a2.pdf>.

Montgomery, Alan, The Implementation Challenge of Pricing Decision Support Systems for Retail Managers, Oct. 2003, Pittsburgh, PA.

Sen, Alper, The U.S. Apparel Industry, Apparel Review, Oct. 2004, Dept. of Industrial Engineering, Bilkent Univ., Bilkent, Ankara, Turkey.

Screenshots, www.grossprofit.com, Oct. 18, 20000 [retrieved Sep. 9, 2004], pp. 1-9. retrieved from: archive.org and google.com.

Koloszyc, Ginger, "Merchants Try Complex Math Tools to Improve Inventory Decisions", Stores Magazine, Nov. 1998 [retrieved Sep. 9, 2004], pp. 1-3, retrieved from Archive.org and Google.com.

\* cited by examiner

OTB ITEM REPORT
Activity: Class 0053
UserID: 'RAYL'
Report date: 8/6/2000

← 302

| SKU number | SKU Description | Month | Actual BOM Inventory (dollars) | Stat BOM Inventory (dollars) | Firm Receipts (dollars) | Notional Receipts (dollars) | Permanent Markdowns (dollars) | Promotional Discounts (dollars) | SRP Change (dollars) |
|---|---|---|---|---|---|---|---|---|---|
| 90421 | 15 - 34 Mens White Pinpoint Oxford Shirt | August-00 | $198,527 | $198,527 | $40,594 | $0 | $0 | $561 | $0 |
| 90421 | 15 - 34 Mens White Pinpoint Oxford Shirt | September-00 | $204,120 | $204,120 | $41,756 | $0 | $0 | $481 | $0 |
| 90421 | 15 - 34 Mens White Pinpoint Oxford Shirt | October-00 | $204,830 | $204,830 | $45,287 | $0 | $205 | $253 | -$1,155 |
| 90421 | 15 - 34 Mens White Pinpoint Oxford Shirt | November-00 | $212,055 | $212,055 | $0 | $44,244 | $311 | $481 | $0 |
| 90421 | 15 - 34 Mens White Pinpoint Oxford Shirt | December-00 | $171,731 | $215,975 | $0 | $28,019 | $1,375 | $695 | $0 |
| 90421 | 15 - 34 Mens White Pinpoint Oxford Shirt | January-01 | $116,465 | $188,729 | $0 | $34,967 | $93 | $572 | $0 |
| 90421 | 15 - 34 Mens White Pinpoint Oxford Shirt | February-01 | $74,871 | $182,102 | $0 | $38,840 | $347 | $0 | $0 |
| 90421 | 15 - 34 Mens White Pinpoint Oxford Shirt | March-01 | $36,473 | $182,544 | $0 | $41,895 | $0 | $209 | $0 |
| 90421 | 15 - 34 Mens White Pinpoint Oxford Shirt | April-01 | $0 | $183,556 | $0 | $42,519 | $0 | $0 | $0 |
| 90421 | 15 - 34 Mens White Pinpoint Oxford Shirt | May-01 | $0 | $183,095 | $0 | $44,212 | $0 | $278 | $0 |
| 90421 | 15 - 34 Mens White Pinpoint Oxford Shirt | June-01 | $0 | $187,800 | $0 | $33,949 | $715 | $0 | $0 |
| 90421 | 15 - 34 Mens White Pinpoint Oxford Shirt | July-01 | $0 | $180,605 | $0 | $38,419 | $0 | $0 | $0 |

| Other Discounts (dollars) | Sales (dollars) | Actual EOM Inventory (dollars) | Stat EOM Inventory (dollars) | Inventory Budget (dollars) | Actual OTB (dollars) | Statistical OTB (dollars) | Lost Sales (dollars) | Statistical Overstock (dollars) | Statistical Overstock With PO (dollars) | Statistical Overstock Above MOQ (dollars) | Statistical Overstock Above MOQ with PO (dollars) |
|---|---|---|---|---|---|---|---|---|---|---|---|
| $69 | $34,370 | $204,120 | $204,120 | $205,000 | $880 | $880 | $4,058 | $0 | $0 | $0 | $0 |
| $93 | $40,473 | $204,830 | $204,830 | $205,615 | $785 | $785 | $4,326 | $0 | $0 | $0 | $0 |
| $49 | $38,711 | $212,055 | $212,055 | $215,025 | $2,970 | $2,970 | $3,014 | $0 | $0 | $0 | $0 |
| $112 | $39,421 | $171,731 | $215,975 | $230,010 | -$30,210 | $14,035 | $0 | $0 | $0 | $0 | $0 |
| $139 | $53,056 | $116,465 | $188,729 | $207,471 | -$53,521 | $18,742 | $0 | $0 | $0 | $0 | $0 |
| $68 | $41,433 | $74,871 | $182,102 | $209,094 | -$80,239 | $26,992 | $0 | $0 | $0 | $0 | $0 |
| $55 | $37,423 | $36,473 | $182,544 | $212,350 | -$116,265 | $29,806 | $0 | $0 | $0 | $0 | $0 |
| $75 | $41,433 | $0 | $183,556 | $214,474 | -$157,672 | $30,916 | $0 | $0 | $0 | $0 | $0 |
| $50 | $40,097 | $0 | $183,095 | $216,618 | -$216,618 | $31,523 | $0 | $0 | $0 | $0 | $0 |
| $74 | $41,433 | $0 | $187,800 | $218,784 | -$218,784 | $30,985 | $0 | $0 | $0 | $0 | $0 |
| $54 | $40,097 | $0 | $180,605 | $220,972 | -$220,972 | $40,367 | $0 | $0 | $0 | $0 | $0 |
| $61 | $41,433 | $0 | $177,550 | $223,182 | -$223,182 | $45,652 | $0 | $0 | $0 | $0 | $0 |

OTB DEPARTMENT REPORT
Activity: Class 0053
UserID: 'RAYL'
Report date: 8/6/2000

| Month | Actual BOM Inventory (dollars) | Stat BOM Inventory (dollars) | Firm Receipts (dollars) | Notional Receipts (dollars) | Permanent Markdowns (dollars) | Promotional Discounts (dollars) | SRP Change (dollars) | Other Discounts (dollars) |
|---|---|---|---|---|---|---|---|---|
| August-00 | $8,631,589 | $8,631,589 | $1,734,905 | $30,036 | $0 | $24,390 | $0 | $3,021 |
| September-00 | $8,844,733 | $8,874,769 | $1,581,986 | $233,501 | $0 | $20,897 | $0 | $4,032 |
| October-00 | $8,642,097 | $8,905,633 | $592,218 | $1,407,321 | $8,900 | $10,982 | -$50,235 | $2,109 |
| November-00 | $7,579,459 | $9,250,317 | $435,480 | $1,488,193 | $13,500 | $20,893 | $0 | $4,875 |
| December-00 | $6,261,726 | $9,420,776 | $0 | $1,218,220 | $59,803 | $30,235 | $0 | $6,054 |
| January-01 | $3,858,861 | $8,236,131 | $0 | $1,520,318 | $4,031 | $0 | $0 | $2,971 |
| February-01 | $2,050,426 | $7,948,014 | $0 | $1,688,701 | $15,092 | $24,874 | $0 | $2,391 |
| March-01 | $380,964 | $7,967,252 | $0 | $1,848,645 | $0 | $0 | $0 | $3,243 |
| April-01 | $0 | $8,011,216 | $0 | $1,821,510 | $0 | $9,086 | $0 | $2,165 |
| May-01 | $0 | $8,078,147 | $0 | $1,922,240 | $0 | $0 | $0 | $3,198 |
| June-01 | $0 | $8,195,751 | $0 | $1,476,060 | $31,093 | $12,094 | $0 | $2,356 |
| July-01 | $0 | $7,882,940 | $0 | $1,670,380 | $0 | $0 | $0 | $2,642 |
| ← 410 | ← 411 | ← 412 | ← 413 | ← 414 | ← 415 | ← 416 | ← 417 | ← 418 |

Figure 4A

| Sales (dollars) | Actual EOM Inventory (dollars) | Stat EOM Inventory (dollars) | Inventory Budget (dollars) | Actual OTB (dollars) | Statistical OTB (dollars) | Lost Sales (dollars) | Statistical Overstock (dollars) | Statistical Overstock With PO (dollars) | Statistical Overstock Above MOQ (dollars) |
|---|---|---|---|---|---|---|---|---|---|
| $1,494,350 | $8,844,733 | $8,874,769 | $8,871,030 | $26,297 | -$3,739 | $176,443 | $2,780,855 | $484,905 | $426,819 |
| $1,759,694 | $8,642,097 | $8,905,633 | $8,935,700 | $293,603 | $30,067 | $188,078 | $2,864,784 | $531,986 | $617,647 |
| $1,683,099 | $7,579,459 | $9,250,317 | $9,353,890 | $1,774,431 | $103,573 | $131,064 | $2,673,907 | $357,218 | $210,759 |
| $1,713,946 | $6,261,726 | $9,420,776 | $9,875,040 | $3,613,314 | $454,264 | $20,712 | $2,573,306 | $215,480 | $94,539 |
| $2,306,772 | $3,858,861 | $8,236,131 | $9,104,530 | $5,245,669 | $868,399 | $1,781 | $2,244,494 | $125,289 | $92,350 |
| $1,801,433 | $2,050,426 | $7,948,014 | $9,012,500 | $6,962,074 | $1,064,486 | $6 | $2,406,190 | $87,930 | $46,449 |
| $1,627,106 | $380,964 | $7,967,252 | $9,324,000 | $8,943,036 | $1,356,748 | $0 | $2,412,804 | $0 | $0 |
| $1,801,438 | $0 | $8,011,216 | $9,245,000 | $9,245,000 | $1,233,784 | $0 | $2,369,028 | $0 | $0 |
| $1,743,327 | $0 | $8,078,147 | $9,378,600 | $9,378,600 | $1,300,453 | $0 | $2,443,946 | $0 | $0 |
| $1,801,438 | $0 | $8,195,751 | $9,458,900 | $9,458,900 | $1,263,149 | $0 | $2,561,743 | $0 | $0 |
| $1,743,327 | $0 | $7,882,940 | $9,210,020 | $9,210,020 | $1,327,080 | $0 | $2,296,062 | $0 | $0 |
| $1,801,438 | $0 | $7,749,240 | $9,198,000 | $9,198,000 | $1,448,760 | $0 | $2,170,372 | $0 | $0 |
| ← 419 | ← 420 | ← 421 | ← 422 | ← 423 | ← 424 | ← 425 | ← 426 | ← 427 | ← 428 |

Figure 4B

OTB DEPARTMENT REPORT
Activity: Class 0053
UserID: 'RAYL'
Report date: 8/6/2000

| Month | BOM Inventory (dollars) | Firm Receipts (dollars) | Notional Receipts (dollars) | Permanent Markdowns (dollars) | Promotional Discounts (dollars) | SRP Change (dollars) | Other Discounts (dollars) | Sales (dollars) |
|---|---|---|---|---|---|---|---|---|
| August-00 | $8,631,589 | $1,734,905 | $30,036 | $0 | $24,390 | $0 | $3,021 | $1,494,350 |
| September-00 | $8,874,769 | $1,581,986 | $233,501 | $0 | $20,897 | $0 | $4,032 | $1,759,694 |
| October-00 | $8,905,633 | $592,218 | $1,407,321 | $8,900 | $10,982 | -$50,235 | $2,109 | $1,683,099 |
| November-00 | $9,250,317 | $435,480 | $1,488,193 | $13,500 | $20,893 | $0 | $4,875 | $1,713,946 |
| December-00 | $9,420,776 | $0 | $1,218,220 | $59,803 | $30,235 | $0 | $6,054 | $2,306,772 |
| January-01 | $8,236,131 | $0 | $1,520,318 | $4,031 | $0 | $0 | $2,971 | $1,801,433 |
| February-01 | $7,948,014 | $0 | $1,688,701 | $15,092 | $24,874 | $0 | $2,391 | $1,627,106 |
| March-01 | $7,967,252 | $0 | $1,848,645 | $0 | $0 | $0 | $3,243 | $1,743,327 |
| April-01 | $8,011,216 | $0 | $1,821,510 | $0 | $9,086 | $0 | $2,165 | $1,801,438 |
| May-01 | $8,078,147 | $0 | $1,922,240 | $0 | $0 | $0 | $3,198 | $1,801,438 |
| June-01 | $8,195,751 | $0 | $1,476,060 | $0 | $12,094 | $0 | $2,356 | $1,743,327 |
| July-01 | $7,882,940 | $0 | $1,670,380 | $31,093 | $0 | $0 | $2,642 | $1,801,438 |

| EOM Inventory (dollars) | Inventory Budget (dollars) | Actual OTB (dollars) | Statistical OTB (dollars) | Lost Sales (dollars) | Statistical Overstock (dollars) | Statistical Overstock With PO (dollars) | Statistical Overstock Above MOQ (dollars) | Statistical Overstock Above MOQ with PO (dollars) |
|---|---|---|---|---|---|---|---|---|
| $8,874,769 | $8,871,030 | $26,297 | -$3,739 | $176,443 | $2,780,855 | $464,905 | $426,819 | $170,728 |
| $8,905,633 | $8,935,700 | $293,603 | $30,067 | $188,078 | $2,864,784 | $531,986 | $617,647 | $308,823 |
| $9,250,317 | $9,353,890 | $1,774,431 | $103,573 | $131,064 | $2,673,907 | $357,218 | $210,759 | $117,088 |
| $9,420,776 | $9,875,040 | $3,613,314 | $454,264 | $20,712 | $2,573,306 | $215,480 | $94,539 | $52,522 |
| $8,236,131 | $9,104,530 | $5,245,669 | $868,399 | $1,781 | $2,244,494 | $125,289 | $92,350 | $62,765 |
| $7,948,014 | $9,012,500 | $6,962,074 | $1,064,486 | $6 | $2,406,190 | $87,930 | $46,449 | $25,805 |
| $7,967,252 | $9,324,000 | $8,943,036 | $1,356,718 | $0 | $2,412,804 | $0 | $0 | $0 |
| $8,011,216 | $9,245,000 | $9,245,000 | $1,233,784 | $0 | $2,369,028 | $0 | $0 | $0 |
| $8,078,147 | $9,378,600 | $9,378,600 | $1,300,453 | $0 | $2,443,946 | $0 | $0 | $0 |
| $8,195,751 | $9,458,900 | $9,458,900 | $1,263,149 | $0 | $2,561,743 | $0 | $0 | $0 |
| $7,882,940 | $9,210,020 | $9,210,020 | $1,327,080 | $0 | $2,298,062 | $0 | $0 | $0 |
| $7,749,240 | $9,198,000 | $9,198,000 | $1,448,760 | $0 | $2,170,372 | $0 | $0 | $0 |

OTB DEPARTMENT REPORT
Activity:TBS Dept 12 OTB
UserID: 'AP01C'
port date: 5/5/2001

| Fiscal Year | Fiscal Month | BOM Inventory (dollars) | Firm Receipts (dollars) | Notional Receipts (dollars) | PERM Markdown (dollars) | Promo Discount (dollars) | Other Change (dollars) | SRP Change (dollars) | Production Need (dollars) | Change In Total Unfilled Production Need (dollars) |
|---|---|---|---|---|---|---|---|---|---|---|
| 2002 | 3 | $14,743,015 | $2,557,658 | $0 | $0 | $21,568 | $0 | $0 | $163,322 | $0 |
| 2002 | 4 | $14,071,372 | $2,566,047 | $0 | $316,663 | $91,417 | $0 | $0 | $202,332 | $83,293 |
| 2002 | 5 | $12,470,927 | $5,879,262 | $1,600,224 | $0 | $150,951 | $0 | $0 | $789,079 | -$34,404 |
| 2002 | 6 | $15,559,873 | $1,698,072 | $1,133,130 | $0 | $49,631 | $0 | $0 | $1,956,573 | -$48,889 |
| 2002 | 7 | $12,497,152 | $561,180 | $1,957,469 | $0 | $59,185 | $0 | $0 | $699,698 | $0 |
| 2002 | 8 | $11,273,057 | $1,055,532 | $2,401,040 | $0 | $10,756 | $0 | $0 | $0 | $0 |
| 2002 | 9 | $11,858,582 | $353,820 | $3,767,586 | $0 | $13,369 | $0 | $0 | $0 | $0 |
| 2002 | 10 | $12,787,073 | $353,820 | $3,914,370 | $0 | $28,868 | $0 | $0 | $0 | $0 |
| 2002 | 11 | $11,286,697 | $353,820 | $3,132,084 | $0 | $763 | $0 | $0 | $0 | $0 |
| 2002 | 12 | $12,119,963 | $250,140 | $2,912,406 | $0 | $0 | $0 | $0 | $0 | $0 |
| 2003 | 1 | $11,732,325 | $0 | $1,987,760 | $0 | $0 | $0 | $0 | $0 | $0 |
| 2003 | 2 | $11,076,576 | $0 | $2,558,016 | $0 | $0 | $0 | $0 | $0 | $0 |

| Sales (dollars) | All Stores Revenue Budget (dollars) | Inventory at End (dollars) | Present Inventory Budget (dollars) | Actual OTB (dollars) | Stat OTB (dollars) | Lost Sales (dollars) | Total Unfilled Production Need (dollars) | Statistical Overstock (dollars) | Available Statistical Overstock Above MOQ (dollars) |
|---|---|---|---|---|---|---|---|---|---|
| $2,973,852 | $2,816,928 | $14,071,372 | $14,000,000 | -$71,372 | -$71,372 | $206,608 | $0 | $1,203,852 | $0 |
| $3,639,373 | $2,432,167 | $12,470,927 | $12,200,000 | -$270,927 | -$270,927 | $80,258 | $83,293 | $839,028 | $0 |
| $3,416,106 | $2,517,575 | $15,559,873 | $15,800,000 | -$1,360,097 | $240,127 | $42,402 | $48,889 | $521,969 | $0 |
| $3,838,831 | $2,905,285 | $12,497,152 | $12,200,000 | -$3,030,506 | -$297,152 | $128,337 | $0 | $320,984 | $0 |
| $2,983,861 | $1,936,876 | $11,273,057 | $11,400,000 | -$4,563,880 | $126,943 | $77,950 | $0 | $220,897 | $0 |
| $2,860,291 | $1,976,235 | $11,858,582 | $12,000,000 | -$6,950,446 | $141,418 | $284,635 | $0 | $18,984 | $0 |
| $3,179,547 | $3,399,624 | $12,787,073 | $13,000,000 | -$10,646,522 | $212,927 | $151,491 | $0 | $1,003 | $0 |
| $5,739,698 | $6,804,840 | $11,286,697 | $11,500,000 | -$11,146,522 | $213,303 | $63 | $0 | $59 | $0 |
| $2,651,875 | $1,956,154 | $12,119,963 | $12,300,000 | -$12,080,000 | $180,037 | $24 | $0 | $0 | $0 |
| $3,550,184 | $2,724,119 | $11,732,325 | $11,900,000 | -$11,735,000 | $167,675 | $28 | $0 | $0 | $0 |
| $2,643,510 | $0 | $11,076,576 | $11,300,000 | -$11,251,000 | $223,424 | $27 | $0 | $0 | $0 |
| $2,632,780 | $0 | $11,001,811 | $11,300,000 | -$11,279,990 | $298,189 | $27 | $0 | $0 | $0 |

METHOD OF COMPARING PRORATED INVENTORY BUDGETS AND SIMULATED FUTURE INVENTORY

RELATED APPLICATION INFORMATION

This application is related to the following applications: application Ser. No. 09/766,539, filed 19 Jan. 2001, entitled Multipurpose Presentation Demand Calendar For Integrated Management Decision Support, by inventor Robert Dvorak; application Ser. No. 09/760,377, filed 12 Jan. 2001, entitled Multipurpose Causal Event Calendar For Integrated Management Decision Support, by inventors Robert Dvorak and Kevin Katari; application Ser. No. 09/755,355, filed 5 Jan. 2001, entitled Method And Apparatus For Supplying Synthetic Sales Histories, by inventors Robert Dvorak and Kevin Katari; application Ser. No. 09/755,635, filed 5 Jan. 2001, entitled Method And Apparatus For Modification OfBasic Good Forecasts, by inventors Robert Dvorak and Kevin Katari; application Ser. No. 09/708,944, filed 8 Nov. 2000, entitled Method And Apparatus For Distribution OfFashion And Seasonal Goods, by inventor Robert Dvorak. The five related applications are hereby incorporated by reference.

BACKGROUND OF THE INVENTION

Retailers have historically used "open-to-buy" (OTB) as a metric to manage their inventory levels at some aggregate level above items, such as the department or category level. OTB is a measure of the amount of additional inventory that may be purchased while remaining within an inventory budget, historically a department or category inventory budget. For example, if a department inventory budget is $100 million and the current inventory level is $75 million, then the open-to-buy is $25 million. Retailers have found OTB very useful as an inventory management tool because it allows inventory management by department or category and in the aggregate. Because inventory represents a significant use of capital for most retailers, good inventory management and controls are critical to overall financial success.

Figure 1:
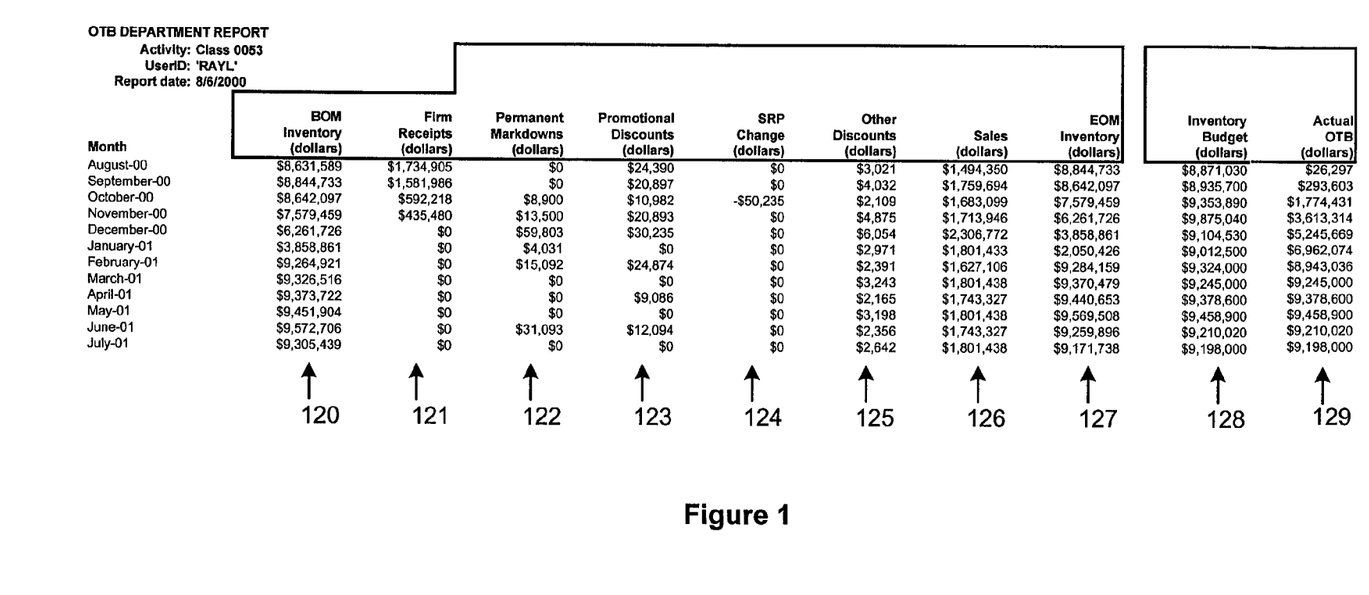
FIG. 1 depicts an open-to-buy department level report that might be generated by typical systems. It does not include notional orders or deliveries (notional receipts) or other aspects of the present invention.

There are many varieties of OTB, including different sets of factors, which work to create a comparison of projected inventory to budget. OTB typically is analyzed monthly. FIG. 1 depicts a typical OTB report. The report columns typically start with last month's ending inventory or this month's beginning (BOM) inventory 120, to which purchase orders scheduled to arrive this month 121 are added. Then permanent markdowns expected to occur 122 are subtracted, promotional discounts expected during the month 123 are subtracted, the impact of Suggested Retail Price (SRP) changes 124 are factored in, as are the impacts of any other factors 125 (e.g., write offs, employee discounts, damages, and shrink). Projected sales 126 (usually at the projected transaction prices) are subtracted out to arrive at the projected ending month (EOM) inventory 127. This ending month inventory is then compared to the budgeted inventory 128 to determine how much open-to-buy dollars 129 are still available within the month.

Figure 2:
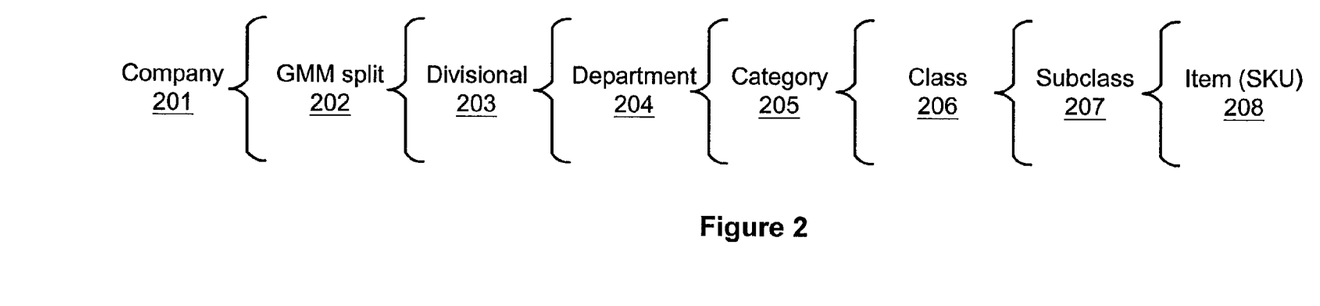
FIG. 2 is a typical hierarchy used by a company to manage classify product and inventory.

Various retailers analyze OTB at different levels of their product hierarchy. To the best of the inventors' knowledge, all large retailers not using the present invention analyze OTB above the individual item level (e.g., at the size, color and style level). FIG. 2 shows a typical retailer product hierarchy, against which OTB analysis normally would compare Department- or Category-level projected inventory to budget.

SUMMARY OF THE INVENTION

The present invention includes methods of and apparatus for analyzing projected future inventory against inventory budgets to determine open-to-buy inventory values. Aspects of the present invention include analyses based on a variety of ways the projecting future inventory. Aspects of the present invention are reflected in the detailed description, accompanying figures and claims accompanying this summary.

BRIEF DESCRIPTION OF THE DRAWINGS

FIGS. 3A-B (collectively "FIG. 3") depict a report at an item level in which an inventory budget has been rolled down from a certain level in the inventory management hierarchy to the item level. Notional orders and receipts or deliveries are reflected in report, together with various analyses.

FIG. 5 is a variation on FIG. 4, with more traditional labeling of columns. Fewer columns are displayed in FIG. 5 than in FIG. 4.

FIG. 6 is a variation on FIG. 5, with the addition of columns to track component inventory used to assemble kits or for other intermediate purposes. In this report, there are finished goods that are being used as intermediate goods in other finished goods, which are then handled differently.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

While the use of open-to-buy metrics has been useful to retailers, the current approach to OTB calculations has significant weaknesses that lead to sub optimal retailer behavior and lack of actionable insight. These weaknesses, some of which are addressed by various aspects of the present invention, include:

Lack of visibility into the source of OTB problems: If a particular category or department is OTB constrained (i.e., the current inventory level is close to exceeding or does exceed the budgeted inventory level), the historical approaches to OTB analysis have not provided specific item level insight as to the root cause of the problem (i.e., which items are causing the excess inventory position). Historically, OTB systems have not generated OTB evaluations at the individual item level (e.g., at the size, color and style level), but instead operate at higher level item groupings, such as department. Historically, OTB systems have not had inventory budgets at the item level, for large retailers, and have not forecasted sales or inventory at the individual item level. Because of this lack of specificity, the actions taken to resolve the OTB problem frequently are not targeted against the real source of the OTB problems. Typically, buying of additional inventory is reduced or curtailed on shorter lead time items (a problem discussed below) and promotional activity is undertaken to increase the rate of selling in the department or category in question. So in many cases the curtailed buying is not of items that will be overstocked, which frequently are the long lead time items, and therefore leads to stockouts and lost sales of short lead time items. In this sense, lead time may include fewer or more components of the time from placement of an order to availability of items for sale at a selling location. Lead time may include such components as data lag time, data processing time, supplier lead time, distribution center ("DC") processing time, DC data lag time, DC data processing time, DC to selling location shipping time, selling location handling time, etc. The lead time components may include supplier lead time plus some or all of these components, depending on the circumstances. In some cases, promotions, to reduce inventory, which frequently include cutting prices, are also run on items that are actually doing fine, resulting in lower profitability than would be achieved if the promotions were targeted at the items really causing the problem.

Long lead time items crowd short lead time items: By definition, long lead time items must be ordered from the vendor or manufacturer earlier than short lead time items in order to be ready for sale by the retailer at the same point in time. If a retailer encounters OTB constraints (i.e., the projected inventory level will be close to or in excess of the inventory budget for some point in the future), ordering of short lead time items is typically reduced or curtailed in order to bring the future inventory position below the budgeted level. Because retailers typically lack visibility into future OTB problems until many of the longer lead-time items have already been ordered, the current OTB management approach produces systematic bias against short lead-time items with sub-optimal results for the retailer. The root cause of this is that the sales and inventories of all items have not been determined on an equal footing, e.g., stocking all items to a forecasted optimal selling level, and therefore the OTB system users of today can not easily tell whether they are buying to much or too little of the longer lead time items relative to the overall OTB budget constraints for the groupings of items that they seek to manage the items in.

Need to manage items in groups for OTB: Large retailers for complexity purposes manage OTB in groups of items above the individual item level. This is because creating an inventory budget for future management purposes is time consuming, managing each OTB group is time consuming, forecasting each OTB group is time consuming and they do not have a mechanism for creating a sufficiently precise OTB budget at the individual item level. So in the past OTB systems have not been built that function at the item specific level.

There are also some secondary weaknesses that cause OTB outcomes to be less than optimal. These are as follows:

Lack of sophistication in fashion or seasonal OTB sales and inventory forecasts: Fashion or seasonal items are typically differentiated from their basic counterparts by their lack of reorderability or the shortness of their sales life. Before they are put on sale their projected sales and inventory levels must be generated without real selling performance and such impacts as store specific presentation quantities are frequently not factored into their projected inventory requirements. Once selling starts then the real sales results should be factored in, however, for those items selling below expectations you must go beyond that to get a good forecast. Markdowns may be required to sell the goods and these markdowns and the resulting sales acceleration and permanent markdowns need to be factored in but OTB systems today do not do that at the individual item level required to really get good forecasts of sales and inventories on the items that are creating problems. These systems also do not have the integration of the markdown system to supply the item and potentially item and location specific markdowns required to sell the goods. Therefore the current OTB systems give an inaccurate picture of what is going to happen once the selling of the short life items starts and specific item level actions start to become apparent.

Lack of incorporation of real world factors into Basic item OTB sales and inventory forecasts: OTB systems today do not include item specific factors like presentation quantities, in dates, out dates and stock out impacts. These can result in material differences in the sales and inventory estimates and therefore should be included to best forecast the OTB position. By best understanding the OTB position at the item level you are then better able to determine the best corrective actions.

A new approach to open-to-buy can address the some of the weaknesses outlined above. Aspects of the invention include:
  (a) building up future sales and inventory projections from an item level upwards—not a more highly aggregated level, such as department or category;
  (b) building OTB projections incorporating expected future orders and receipts—calculated by the system if required—into the open-to-buy calculation, with the simulated ordering and receipt extending at least as far into the future as the longest lead time item or needed to cover lead times for ordering and receiving delivery of most items; and
  (c) identifying items that are on a course to being over bought, relative to the optimal inventory levels or the inventory budget levels.

This approach can then also be improved by mixing in the following additional elements:
  (d) building OTB projections from selling locations (typically stores) and stocking location model stocks over time, reflecting the desired inventory level in each location to support selling and presentation requirements; and
  (e) building sales and inventory levels at the item and location level, incorporating item specific seasonality, promotion, and other real world factors such as in dates, out dates and projected stock out impacts.

These components may be mixed and matched in accordance with the various aspects of the present invention. One approach to executing the new OTB methodology is to run a simulation for individual items and locations, simulating projected sales and other factors impacting inventory levels. Simulated results are rolled up to arrive at a higher level of the product hierarchy, the level at which OTB management takes place. As a corollary, a system may roll back down budgets set at the higher level and suggest which items are over or under stocked so that corrective actions can be taken. The roll down of budgets to items can be extended by constraining notional orders/deliveries to fit within budget and reporting the lost sales resulting from adherence to budget. The OTB over or under stock calculations compare budgeted inventories and projected inventories. These comparisons can be done different ways, driven by different definitions of the budgeted inventory. For example, sometimes the budgeted inventory is the end of month inventory level. Other times it is the beginning of month level. Occasionally, it is an average or peak value during the month. The example that follows uses the end of month inventory for OTB comparisons. However, the math works similarly for the other cases, using different points of comparison. FIGS. 3-6 depict sample reports derived from OTB analysis in accordance with aspects of the present invention. Steps useful to generation of reports or displays such as FIGS. 3-6 may include the following:

Determine the time horizon ("end date"). The end date of the simulation can be set arbitrarily, but should extend far in enough in the future to be further out than the lead time of the longest lead-time item being analyzed. It may be the inventory management planning time horizon. There may be exceptions where that inventory management planning time horizon is shorter than the longest lead-time item, e.g., where there are a few items with very long lead-times, and then one could use the inventory management planning time horizon, e.g., frequently a year, as the end date. In FIG. 3, the end date would be the month 310.

Determine the expected sales for the item for each day for each location until the end date. Expected sales need to be forecasted. In one embodiment, expected sales are forecast for each selling location on a daily or more frequent basis. Various methods of doing this calculation are set for the in the applications incorporated by reference. Weekly or adjusted weekly forecasts also may be used in accordance with the present invention. Numerous causal and non-causal techniques are used by retailers to forecast sales, including ARIMA, multivariable regression, and historical selling extrapolation. Location-day forecasts can reflect causal events that affect the rate of selling, such as promotions, presentation changes, and seasonal events. Adjusted weekly forecasts may include weekly forecasting approaches that then try to take into account daily selling differences. For example, a weekly sales forecasting approach that then factors in promotions for part of a week by adjusting the weekly forecast for a fraction of the week that falls during the promotion is attempting to make a weekly forecast more accurate. Those sales should then be forecasted taking into account specified factors such as in dates, out dates and last PO receipt dates. Those sales can be forecast to achieve the maximum service level possible (i.e., always in stock-target), a specified lesser in stock level, an optimal economic stocking level (i.e., a stocking level where the in stock target reflects economically optimal tradeoff of potentially losing a sale versus the costs of having extra inventory at that location to avoid losing the sale).

In the case of short life or non reorderable items, such as seasonal or fashion items, the sales forecast should change from the preseason buying plan to take into account actual sales during the selling season. For items under performing their plan, OTB analysis can factor in the causal events (e.g., sales or promotions) that would be needed to close out inventory and finish the program. A user-friendly way of doing this is to use the optimal answer from a markdown optimizer as a causal input to projected future sales and inventory. This gives the optimal seasonal or fashion selling performance without additional user entry. Given that OTB would be running at the item level, which can be well above a million items for a department store retailer, having a highly automated solution is useful in making the more accurate item level OTB work.

Item level forecasting approaches also can take into account factors such as projected stock outs within the current order cycle of each item, by reducing the projected sales by the likely impact of the stock out. When the system identifies projected stock outs, potential corrective actions can be considered, such as expediting an existing purchase order or placing an additional expedited purchase order. Daily sales forecasts can be rolled up to monthly totals, to give the item level sales forecast 319 in FIG. 3. Item level sales within an OTB grouping, such as a Department, can be totaled to give the sales value 419 in FIG. 4 for a Department. Column 419 in FIG. 4 would then be an improved forecast of future sales and inventory. The system calculations could also identify any projected sales lost because of stock outs, 325 in FIG. 3, and roll those values up to get the total Department value 425 in FIG. 4.

Determine the desired or optimal selling model stock inventory level for each day for each location until the end date. The desired or optimal stock for each selling location (typically stores and distribution centers) will be based on a determination of the appropriate model stock stocking level for each location given that location's expected selling level (or the selling and stocking requirements of the locations that it services) and the variability of that selling or stocking requirements and the cycle times involved in stocking the location, along with the frequency of replenishment from a distribution center to that location. Multiple techniques exist for determining the model stock, which typically are based on the expected selling with additional safety stock to support variability from the expected selling. The model stock may be adjusted to take into account presentation quantities needed for an attractive sales display of an item. The system also could identify items that are overstocked relative to the optimal, desired or budgeted OTB stocking level. It can identify overstocks in a number of different manners.

One manner is to compare the projected stocking level for each item and location to a model stock driven optimal value and identify any values above the model stock as a Statistical Overstock, column 326 in FIG. 3. The item in FIG. 3 does not happen to have an overstock and actually is understocked through the end of the time period for which there are Firm Receipts 313, as shown by the lost sales in August-00 through October-00 325. However, had there been overstocks they would have shown up in 326. The total of those item values would be rolled up into higher level groups, as in column 426 of FIG. 4. Further refinements may be introduced, including whether the overstocks exceed outstanding purchase orders (placed but not fulfilled) for the item, 327 in FIGS. 3 and 427 in FIG. 4. The values in 327 are calculated using the smaller of the Statistical Overstock value 326 and Finn Receipts 313. The higher hierarchy level values like the department level value in 427 are simply the mathematical summation of the 327 values for all the items in the department. Outstanding purchase orders may be a focus of analysis because many retailers cannot send back inventory that they already own and so are interested in first identifying inventory ordered but not received. Another determination may include the overstocks in excess of the minimum order quantity MOQ, columns 328 in FIGS. 3 and 428 in FIG. 4. Many retailers have to purchase goods in minimum order quantities and therefore at the point that they place an order they are likely to order more than they need at that moment. For overstock in excess of MOQs, the Statistical Overstock 326 is compared to the Minimum order quantity value, and Statistical Overstock Above MOQ 328 is the Statistical Overstock 326 minus the Minimum order quantity value. If the difference is negative, then it is set to 0. Again, the department level grouping 428 is simply the summation of all the item level values 328 for all the items in the department. Finally, retailers may want to combine the tests of whether they have POs and whether the stock is then above the MOQ with a combination test as shown in columns 329 in FIGS. 3 and 429 in FIG. 4. The Statistical Overstock above MOQ with PO 329 is at the item level the minimum of the Statistical Overstock with PO 327 and the Statistical Overstock Above MOQ 328. Again the department level value 429 is simply the mathematical addition of all the values 329 for all the items in the department.

Figure 4A:
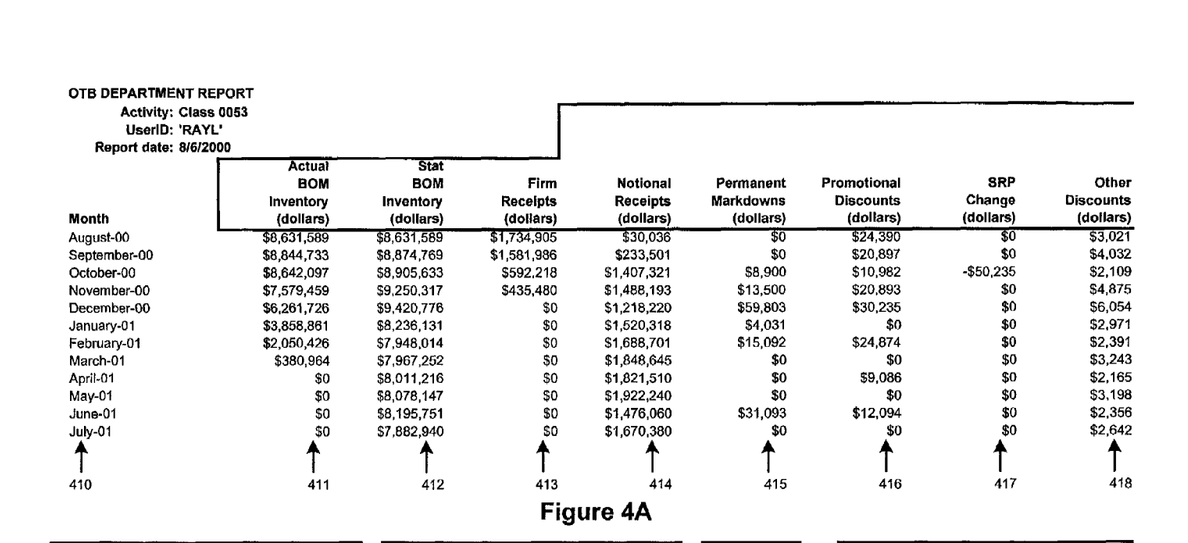
FIG. 4 depicts application of aspects of the present invention depicted in FIG. 3, but applied at a department level, instead of an item level.
Figure 4B:
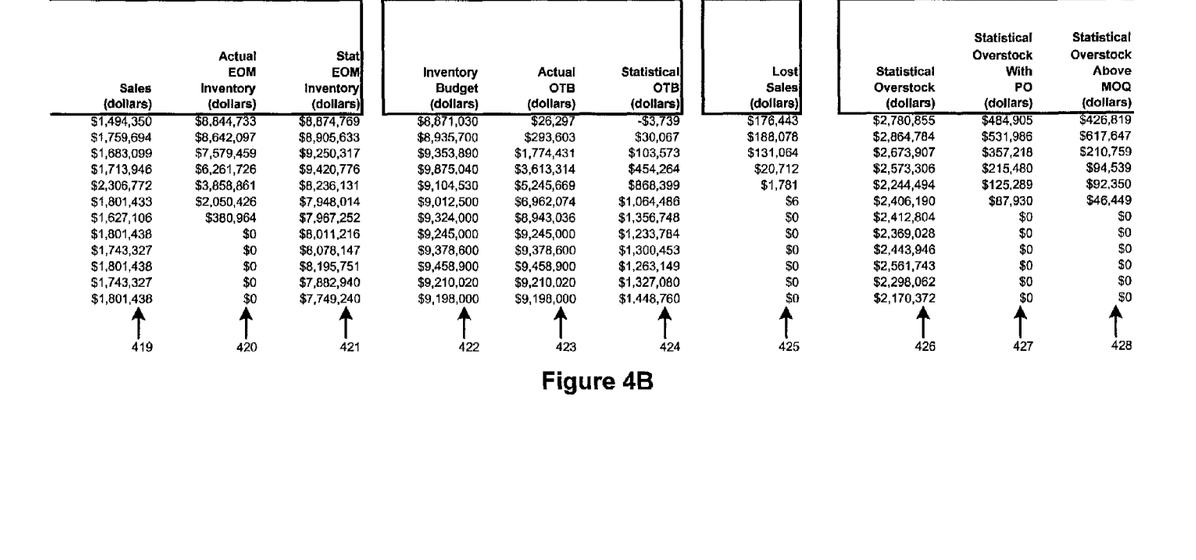

Another measure of overstocks is depicted in FIGS. 3 and 4, where the inventory budget is prorated by the system from the OTB grouping level, in this example the department level of FIG. 4, down to the item level of FIG. 3. One prorating approach is to take the budgeted inventory level and prorate it to the individual items based on projected sales. Sales could be the projected sales 419 in FIG. 4 or the column 419 sales plus estimated lost sales 429. The actual proration would be done using the item level values of projected sales 319 or the projected sales 319 plus the estimate of lost sales 329. Since each value adds up to the total for 419 or the total of 429, the proration is done using the individual values divided by the department level value (i.e., 419 or 419 plus 420) multiplied by the department inventory budget to get the individual item inventory budget values. By combining in the lost sales estimate you weight each item against its full potential. Another prorating approach would be to use the projected inventory model stocks (before or after the incorporation of factors like stock out impacts or presentation quantities) to prorate the budgeted inventory. By using this prorating approach you are factoring in the elements that are not included in the sales projections like visual presentations. You could also use a prorating approach of using the end of month projected inventory 421 in FIG. 4 to create the item level inventory budget. The way that would work is the Statistical (Stat) End of Month (EOM) inventory 321 for all the items in the department (which would total to 421) divided by 421 multiplied by the Inventory Budget 422 for the entire Department would give the individual item Inventory Budget 322. That value would be used to calculate the item level Statistical OTB 324. As the Stat EOM Inventory 321 could be calculated a number of different ways, there are many variations on the resulting Stat inventory level. For example, presentation quantities may or may not be included in the Stat Inventory level 321. Stock-outs may or may not be corrected for in the calculation of the Stat Inventory level 321. The Stat Inventory 321 may be set from calculations where economic optimal stocking levels are determined or specific service levels could be set and used for the stocking level determination. For short life items, the Stat Inventory 321 may be determined with or without any ability to reorder the item. There may even be the opportunity to reduce the order on already ordered items by removing some or all of the remaining units by sending it to another channel (not counted in the OTB calculation like is occasionally done with Outlet Stores that are in a separate OTB) or selling it off to another company (e.g., another retailer or wholesaler). Which of these prorating approaches used can be adjusted to suit the desires of the retailer.

Determine additional notional orders that will need to be placed in the future, including the expected quantity and receipt date for those orders to put all items on an equal footing. Notional orders and deliveries or receipts refer to system projected orders and resulting deliveries that have not been submitted to suppliers. Order needs in the future can be estimated on a daily basis to keep items stocked at their model stock inventory level. This would be done for every reorderable item taking into account lead times and sales out dates. Some items, such as fashion or seasonal, may not be reorderable in the timeframe analyzed, so for those items there would be no notional orders. Use of notional orders and deliveries can put the short lead time and long lead time items on an equal footing for OTB analysis.

Statistical OTB affords a forward view that equally protects long and short lead-time items. To achieve this in the statistical OTB, you include the notional orders (orders that would keep the item stock at an economic optimal or specified service level) in the calculation thereby optimally stocking all ongoing items throughout the entire time horizon for the OTB calculation. The report might look like FIGS. 3 and 4 and include calculations of both the actual OTB 323 and 423 and Statistical OTBs 324 and 424. Alternatively, reports may not show all of the columns, for example, leaving out the actual EOM inventories 320 and 420, as in FIG. 5, where the Stat EOM Inventory 421 in FIG. 4 is relabeled EOM Inventory 521.

The statistical OTB calculation assumes that the notional receipts—314 and 414—will be received; it includes notional orders/receipts in the determination of the statistical (Stat) end of month (EOM) inventory—321 and 421. The math is very similar to the other OTB calculations, typically starting with last month's Statistical ending inventory shown as this month's Statistical (Stat) beginning (BOM) inventory 312 or 412, to which any purchase orders that are scheduled to arrive this month Firm Receipts 313 or 413 are added as well as any notional orders determined to arrive during the month Notional Receipts 314 or 414, then any Permanent Markdowns 315 or 415 expected to occur are subtracted, any Promotional Discounts 316 or 416 expected during the month are subtracted, the impact of any Suggested Retail Price (SRP) Changes 317 or 417 are factored in, as are the impacts of any Other Discounts 318 or 418 (e.g., write offs, employee discounts, damages, and shrink), projected Sales 319 or 419 (usually at the projected transaction prices) are subtracted out to arrive at the projected Statistical ending month inventory Stat EOM Inventory 321 or 421. This ending month inventory is then compared to the budgeted inventory 322 (a prorated value) or 422 to determine how much Statistical open to buy (OTB) dollars 324 or 424 are still available within the month.

The Statistical OTB can be calculated at any level of the product hierarchy right down to the item level—324. Statistical OTB values will put all items on an equal footing without bias against short or long lead-time items and helps retailers target inventory areas or items that cause problems. Statistical OTB may be used to understand the severity of inventory problems (e.g., the statistical OTB at the item level) and where to target actions (e.g., the items with the largest statistical OTB problem).

The statistical OTB can be extended by using rolled down inventory budgets to constrain notional orders and deliveries. Any prorating or other approach can be taken to rolling down the inventory budget to individual items or another level of the inventory hierarchy. Notional orders, whether based on optimal stock, service level (in stock performance), or some other criteria, can be constrained by the rolled down inventory budget. Individual items can be constrained or groups of items can be constrained so that a notional order/delivery remains within budget. The constrained notional delivery quantity can be used to calculate stockouts and lost sales. In an iterative process, budgets and prorations can be adjusted to minimize lost sales, lost profit or any other measure of sales effectiveness. An additional aspect of the present invention is taking into account component inventory, for product that is ordered through the typical OTB process but which should not be part of the OTB calculation. Different kinds of situations would potentially cause this to occur. One example would be product that is purchased for use in creating other products, (e.g., kits, and gift baskets), where the final products are counted in OTB but not the items used in creating the gift baskets or kits (e.g., because that would be double counting).

However, to minimize work, satisfy minimum order quantities, and minimize overall inventory, the ordering requirements would likely be combined for joint management. So in calculating the OTB values for a particularly period of time, the non-OTB managed value which in FIG. 6 is labeled Production Need 640 would be removed from the inventory (in this example because of the sign convention used the value would be subtracted from the inventory) and if there were not sufficient inventory available to satisfy that need then a value would be added to the Change in Total Unfilled Production Need 641 and that value added back to the inventory calculation that otherwise would be done as previously described. To keep a running total of all the unfilled production needs then and additional column would be added labeled the Total Unfilled Production Need 642 and the net impacts of what is going on in column 641 would be made to column 642. So this way you not only have a sophisticated mode of calculating OTB but can accommodate joint ordering and management of items that are then not going to be managed within the current OTB or in this particular department's OTB.

Figure 7:
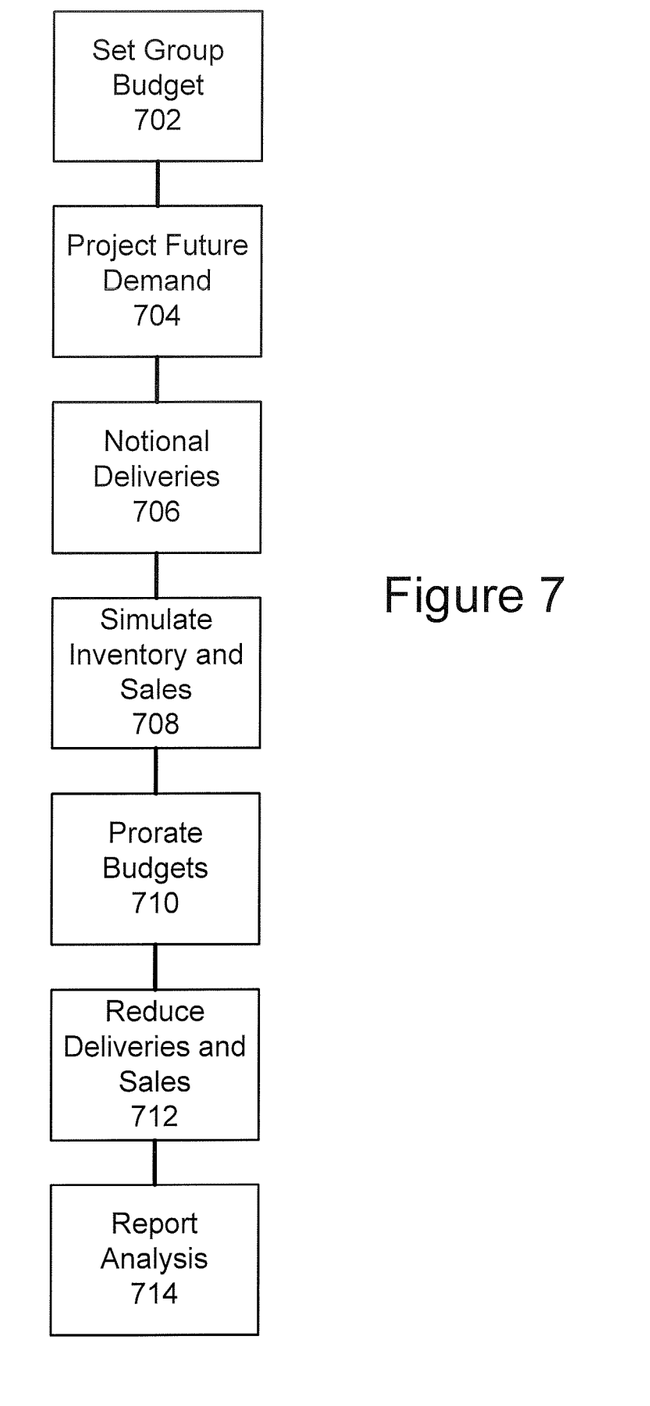
FIG. 7 depicts steps that may be combined in a method that produces open to buy inventory analytics.

One embodiment disclosed is a method of prorating inventory budgets among items, as depicted in FIG. 7. This method includes setting inventory budgets for groups of items 702 and projecting future sales for the items 704. It further includes setting notional deliveries for the items 706, utilizing (to set the notional deliveries) the projected future sales unconstrained by the inventory budgets. It includes projecting future inventory for the items 708, utilizing current inventory, the projected future sales, firm future deliveries and the notional deliveries. It further involves prorating the inventory budgets 710 among the items, for a plurality of predetermined time periods. It reports open to buy values 714 that compare the prorated inventory budgets for the items or aggregations of the items to the projected future inventory for the items or aggregations of the items. A further technology sometimes combined with this embodiment includes calculating 712 reduced notional deliveries for the items consistent with prorated open to buy inventory budgets and calculating lost sales 712 for the items based on the reduced notional deliveries.

While the preceding examples are cast in terms of a method, devices and systems employing this method are easily understood. A magnetic memory containing a program capable of practicing the claimed method is one such device. A computer system having memory loaded with a program practicing the claimed method is another such device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A computer-implemented method of evaluating the impact of inventory budgets on availability of items to meet projected future demand, including:

setting inventory budgets for groups of items;
prorating the inventory budgets among the items to create prorated inventory budgets that can be compared to simulated inventory costs;
projecting future demand for the items;
scheduling simulated orders and deliveries for the items in quantities sufficient to meet the projected future demand for the items, unconstrained by the inventory budgets;
simulating future inventory for the items, utilizing current inventory, the projected future demand, firm future deliveries and the simulated orders and deliveries; and
reporting a comparison of the prorated inventory budgets to inventory costs that would result from executing the simulated orders and deliveries in quantities sufficient to meet the projected future demand.

2. The method of claim 1, further including:
calculating reduced simulated orders and deliveries for the items consistent with the prorated inventory budgets; and
calculating lost sales for the items based on the reduced simulated orders and deliveries.

3. The method of claim 2, wherein the simulated orders and deliveries are constrained by lead time for ordering and obtaining delivery of the items.

4. The method of claim 2, wherein future sales for the items are simulated on a daily or more frequent basis.

5. The method of claim 2, wherein the simulated orders and deliveries are based in part on optimal stocking levels.

6. The method of claim 5, further including reporting the simulated future inventory levels that exceed the optimal stocking levels.

7. The method of claim 5, further including reporting values of purchase orders that have been placed but not fulfilled for the items having the simulated future inventory levels that exceed the optimal stocking levels.

8. The method of claim 5, further including reporting values exceeding minimum order quantities of purchase orders that have been placed but not fulfilled for the items having the simulated future inventory levels that exceed the optimal stocking levels.

9. The method of claim 1, wherein the simulated orders and deliveries are constrained by lead time for ordering and obtaining delivery of the items.

10. The method of claim 1, wherein the projected future demand for the items are projected on a daily or more frequent basis.

11. The method of claim 1, wherein the simulated orders and deliveries are based in part on optimal stocking levels.

12. The method of claim 11, further including reporting the simulated future inventory levels that exceed the optimal stocking levels.

13. The method of claim 12, further including reporting values of purchase orders that have been placed but not fulfilled for the items having the simulated future inventory levels that exceed the optimal stocking levels.

14. The method of claim 12, further including reporting values exceeding minimum order quantities of purchase orders that have been placed but not fulfilled for the items having the simulated future inventory levels that exceed the optimal stocking levels.

15. The method of claim 11, wherein the simulated orders and deliveries are consistent with presentation quantities for the items at respective selling locations associated with the items.

16. The method of claim 11, wherein the simulated orders and deliveries are determined with reference to a causal calendar of events.

17. The method of claim 11, wherein the simulated orders and deliveries take into account planned promotions.

18. The method of claim 11, wherein the simulated orders and deliveries are consistent with minimum order quantities for the items.

19. The method of claim 1, wherein the projected future demand levels are based in part on desired in stock service levels.

20. The method of claim 1, wherein future sales levels are corrected for stockouts at respective selling locations associated with the items.

21. The method of claim 1, wherein the notional delivery levels are consistent with presentation quantities for the items at respective selling locations associated with the items.

22. The method of claim 1, wherein the simulated orders and deliveries are determined with reference to a causal calendar of events.

23. The method of claim 1, wherein the simulated orders and deliveries take into account planned promotions.

24. The method of claim 1, wherein the simulated orders and deliveries are consistent with minimum order quantities for the items.

25. The method of claim 1, wherein the prorating is based on the simulated future sales.

26. The method of claim 25, wherein the simulated future sales take into account any simulated lost sales due to stockouts for the item.

* * * * *